US011290638B1

(12) United States Patent
Duffy

(10) Patent No.: US 11,290,638 B1
(45) Date of Patent: Mar. 29, 2022

(54) SYSTEMS AND METHODS FOR GENERATING CONSISTENT IMAGES OF OBJECTS

(71) Applicant: Photon Ventures Inc., Ventura, CA (US)

(72) Inventor: Peter Anthony Duffy, Ventura, CA (US)

(73) Assignee: Photon Ventures Inc., Ventura, CA (US)

( * ) Notice: Subject to any disclaimer, the term of this patent is extended or adjusted under 35 U.S.C. 154(b) by 0 days.

(21) Appl. No.: 17/204,713

(22) Filed: Mar. 17, 2021

(51) Int. Cl.
*H04N 5/232* (2006.01)
*G06T 7/73* (2017.01)

(52) U.S. Cl.
CPC ........... *H04N 5/23222* (2013.01); *G06T 7/73* (2017.01); *H04N 5/23216* (2013.01); *H04N 5/23229* (2013.01); *H04N 5/232941* (2018.08); *H04N 5/232945* (2018.08)

(58) Field of Classification Search
CPC .......... H04N 5/23222; H04N 5/23229; H04N 5/23216; H04N 5/232945; H04N 5/232941; G06T 7/73
See application file for complete search history.

(56) References Cited

U.S. PATENT DOCUMENTS

2014/0104379 A1* 4/2014 Glasgow ............. H04N 13/106
348/42

* cited by examiner

*Primary Examiner* — Yogesh K Aggarwal
(74) *Attorney, Agent, or Firm* — Ansari Katiraei LLP; Arman Katiraei; Sadiq Ansari

(57) ABSTRACT

A system for consistently imaging objects may include an imaging device that presents a visual guide on a display for aligning with a target object, and that uses sensors of the imaging device to provide exact direction for correctly aligning the visual guide with the target object prior to capturing an image of the target object. The system may include a device that receives a particular image of a particular object, selects a model that defines positional commonality or visual characteristic commonality between a set of images of the particular object or a particular object type that includes the particular object, and that generates an edited image by correcting one or more deviations between positioning of the particular object in the particular image and the positional commonality specified in the model, or between visual characteristics of the particular image and the visual characteristic commonality specified in the model.

18 Claims, 8 Drawing Sheets

SYSTEMS AND METHODS FOR GENERATING CONSISTENT IMAGES OF OBJECTS

BACKGROUND

Photography and imaging are effective means by which to market and/or advertise goods and services. However, low-quality, inconsistent, and/or differing photography and imaging may adversely affect the promotion and/or sale of those goods and services. For instance, a photographer may fail to consistently frame or align images for the same object or related objects, and/or may generate multiple images for the same object or related objects with different backgrounds, lighting, and/or other differences in visual characteristics. The variations and/or inconsistencies between images may result in an unprofessional presentation of the imaged goods and services, which in turn, may reduce the effectiveness of any marketing and/or advertising campaign that is based on the images.

DETAILED DESCRIPTION OF PREFERRED EMBODIMENTS

Figure 1:
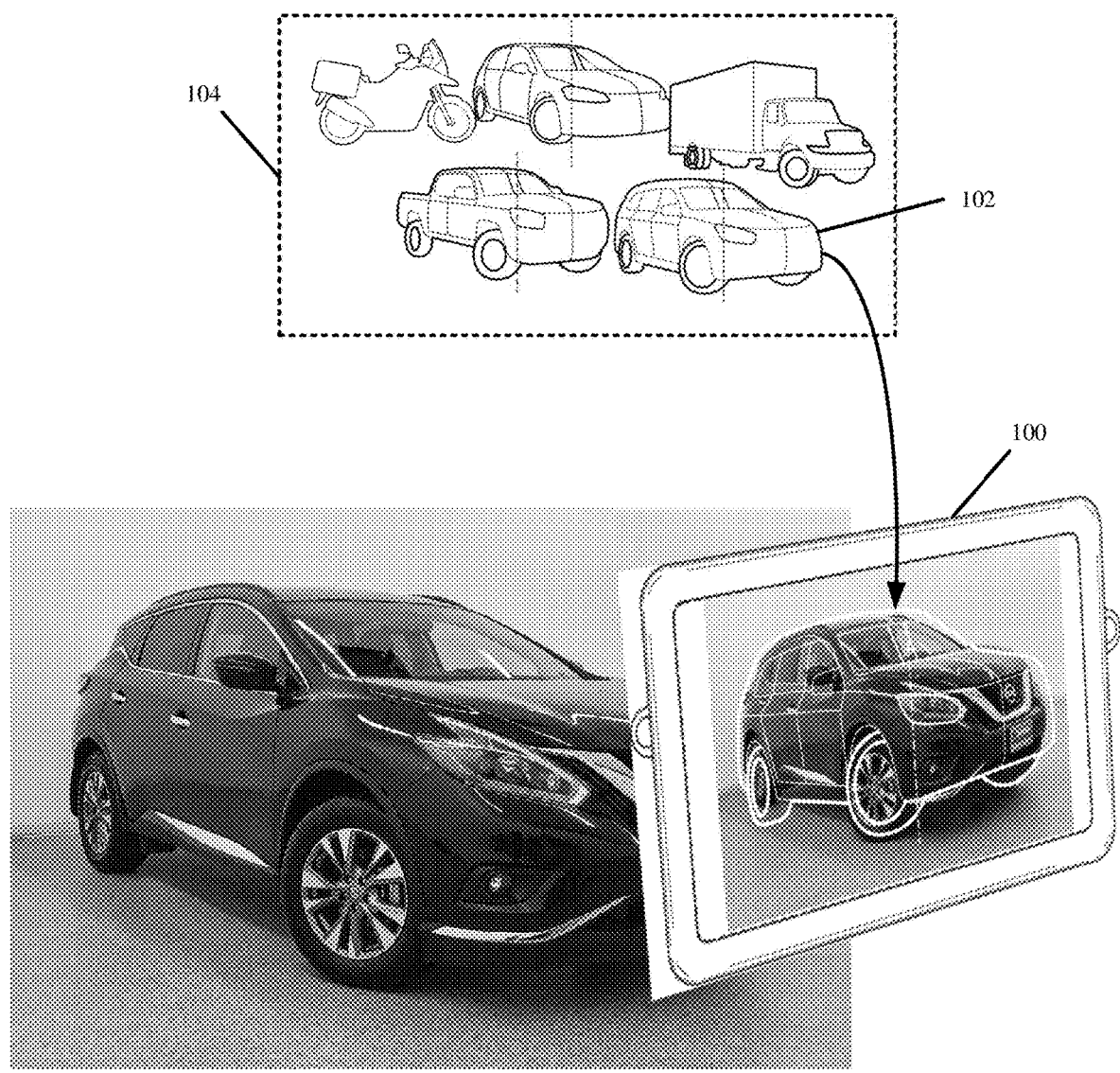
FIG. 1 illustrates an example of an imaging device providing a visual guide in accordance with some embodiments presented herein.

The following detailed description refers to the accompanying drawings. The same reference numbers in different drawings may identify the same or similar elements.

Provided are systems and methods for generating consistent images of objects. In particular, the systems and methods may produce images with consistent positioning and/or visual characteristics (e.g., coloring, lighting, exposure, highlights, temperature, sharpness, contrast, brightness, tint, shadows, reflectivity, etc.) based on a combination of visual guides and imaging device sensors that correct the positioning of the objects before the images are captured, and/or based on adjustments that are automatically applied after the images are captured to improve or increase the consistency between the positioning and/or visual characteristics of the objects in the captured images and other images of the same or related objects. The positioning of an object may include the size, distance, height, angle, framing, alignment, background, and/or other spatial attributes of the object within the image. The positioning of an object may also include cropping and/or leveling an image and/or the object within the image. The visual characteristics of an object may include the coloring, lighting, exposure, highlights, temperature, sharpness, contrast, brightness, tint, shadows, reflectivity, and/or other properties that affect the rendering of the object. The imaged object may include a good, product, and/or another item.

The systems and methods may include an imaging device with a camera, one or more sensors, and a display. Measurements and/or output from the imaging device sensors may be used to determine proper alignment between a visual guide, such as a wireframe or skeletal model, that is overlaid or otherwise presented on the display and objects that the camera captures and/or presents within the display. In some embodiments, the sensor output may be mapped to direct the positioning (e.g., distance, height, tilt, rotation, etc.) of the camera or imaging device relative to the object that is being imaged and/or the visual guide that is presented on the screen.

The systems and methods may further include a postprocessing system that uses artificial intelligence and/or machine learning ("AI/ML") to automatically detect positional and/or visual characteristic inconsistencies between an object in a particular image and the same object or a related set of objects in one or more other images, and to automatically correct the positional and/or visual characteristic inconsistencies in the particular image based on AI/ML adjustments that are derived from a modeling of the positional and/or visual characteristics of the one or more other images. For instance, the postprocessing system may compare positioning and/or visual characteristics of the object in each of an edited set of images. The postprocessing system may detect positional and/or visual characteristic commonality in the edited set of images as a result of the comparison, and may generate a model that defines a particular positioning and/or particular visual characteristics for consistently imaging a particular object or particular object type from the edited set of images. In some embodiments, the positional and/or visual characteristic commonality for the model may be defined relative to a particular visual guide that is used when imaging the particular object or the particular object type. The postprocessing system may receive a set of unedited images, and may adjust the positioning and/or visual characteristics of the object or object type within the set of unedited images for consistency with the same or related object or object type in the set of edited images.

FIG. 1 illustrates an example of imaging device 100 providing visual guide 102 in accordance with some embodiments presented herein. Imaging device 100 may include a tablet, smartphone, camera, and/or other device with an imaging sensor (e.g., a charge-coupled device ("CCD"), complementary metal-oxide-semiconductor ("CMOS"), etc.) or other integrated camera. Imaging device 100 may also include a display or viewfinder for presenting a real-time image of the imaging sensor of camera field-of-view. Imaging device 100 may be a specialized device that is configured with and/or executes an application for presenting selected visual guide 102 from plurality of visual guides 104 in the display over the real-time image from the camera.

Each visual guide from plurality of visual guides 104 may include a wireframe, skeletal model, and/or outline for a different object or object type. For instance, visual guides 104 may be used for consistent imaging of different vehicles with a first visual guide providing a wireframe for a coupe of a first make and model, a second visual guide providing a wireframe for a coupe of a different second make and model, a third visual guide providing a wireframe for a sport utility vehicle ("SUV") of a first make and model, and a fourth visual guide providing a wireframe for a SUV of a second make and model. Alternatively, or additionally, visual guides 104 may be used for consistent imaging of different vehicles with a first visual guide providing a generic coupe wireframe for multiple coupe makes and models, a second visual guide providing a generic sedan wireframe for multiple sedan makes and models, a third visual guide providing a generic SUV wireframe for multiple SUV makes and models, and a fourth visual guide providing a generic truck wireframe for multiple truck makes and models.

In some embodiments, imaging device 100 may automatically select visual guide 102 from plurality of visual guides 104 based on an automatic identification of the object appearing within the camera field-of-view. For instance, imaging device 100 may perform an image processing routine to determine that the object within the camera field-of-view corresponds to a SUV, may automatically select visual guide 102 representing the SUV wireframe, and may overlay the SUV wireframe at the center of the display. In some embodiments, a user may manually select a desired visual guide by providing input to imaging device 100. For instance, the user may select a particular vehicle make and model from a set of drop-down graphical elements, and imaging device 100 may retrieve and display the correct visual guide for the selected make and model from plurality of visual guides 104.

Selected visual guide 102 may be presented at a center of the imaging device display (e.g., a center of the selected visual guide may be placed at the center of the imaging device display). In some embodiments, selected visual guide 102 may be offset from the center of the display in order to provide an alternative framing for the object represented by selected visual guide 102. In any case, selected visual guide 102 may be presented at a fixed position within the display, and selected visual guide 102 may include a wireframe, skeletal model, or outline with regions of transparency through which the image being captured by the imaging sensor or camera is observable in the imaging device display or viewfinder. In other words, selected visual guide 102 may be overlaid atop the image being recorded by the imaging sensor or camera without obscuring the image underneath.

A user may physically manipulate imaging device 100 until the object being imaged and presented in the display is aligned with visual guide 102, and may provide input to capture and/or record an image of the object once the object and visual guide 102 are properly aligned. In some embodiments, imaging device 100 may provide visual queues to notify the user when proper alignment is achieved. For instance, imaging device 100 may present visual guide 102 with a first color when the object is misaligned with visual guide 102, and may change the visual guide color from the first color to a second color when the object becomes aligned with visual guide 102. Additionally, in some embodiments, imaging device 100 may automatically activate the camera shutter and may capture the image upon detecting alignment between the object and visual guide 102.

Visual guides 104 may assist in consistently positioning an object or different objects in the captured images. However, visual guides 104, by themselves, may not indicate the physical manipulations of imaging device 100 that are needed to correctly align the imaged object with the presented visual guide. Consequently, a user may align an object within the boundaries of a visual guide, but the object may nevertheless be misaligned relative to a position, height, and/or orientation at which to capture and/or record the image which, in turn, may result in inconsistencies in the resulting images. For instance, the user may tilt or rotate imaging device 100 downwards from a first height in order to achieve alignment between the imaged object and the visual guide, whereas correct alignment may involve lowering imaging device 100 from the first height to a second height and imaging the object without any tilt or rotation. Similarly, the user may tilt or rotate imaging device 100 downwards from the first height in order to align the presentation of a first object in the display with the visual guide in the display, may capture a first image of the first object, may move to a second similar object, may align the presentation of the second object in the display with the visual guide in the display by lowering imaging device 100 from the first height to the second height instead of tilting or rotating imaging device 100 at the first height, and may capture a second image of the second object from the second height which is inconsistent with the first height, the camera tilt, and the camera orientation at which the first object was imaged. In these examples, the captured image may be inconsistent with other images that are captured using the same visual guide, and/or may be inconsistent with a desired angling, perspective, and/or sizing of the visual guide.

To ensure accurate and desired alignment between the object that is being imaged and the visual guide that is presented on the display of imaging device 100, some embodiments integrate measurements and/or output from the one or more sensors of imaging device 100 as part of the visual guide presentation. Specifically, imaging device 100 may determine exact manipulations (e.g., movement, rotations, tilting, distance, etc.) with which to correctly align the object that is being imaged with the presented visual guide based on current position of imaging device 100 and the measurements and/or output from the sensors, and may present the determined manipulations on the display in conjunction with the visual guide.

Figure 2:
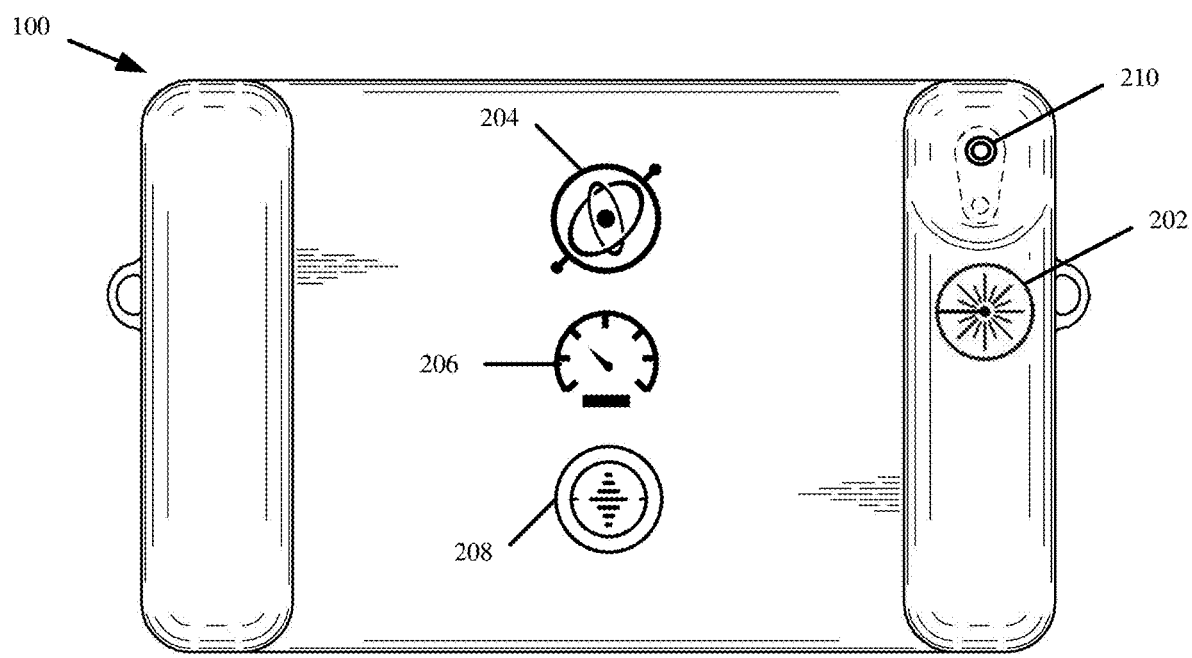
FIG. 2 illustrates various sensors of the imaging device that integrate with the visual guides in order to direct the alignment of an imaged object with the visual guides in accordance with some embodiments presented herein.

FIG. 2 illustrates various sensors of imaging device 100 that integrate with the visual guides in order to direct the alignment of an imaged object with the visual guides in accordance with some embodiments presented herein. As shown in FIG. 2, imaging device 100 may include light detection and ranging ("lidar") sensor 202, gyroscope 204, accelerometer 206, altimeter 208, imaging sensor 210 (e.g., camera), and/or other sensors that produce measurements and/or output for enhancing the visual guide that is presented on the display of imaging device 100.

Lidar 202 may correspond to a depth or distance sensor that measures a distance between imaging device 100 and the object being imaged. Based on the measurement from lidar 202 and the difference between the measurement and a desired distance that is specified for a selected visual guide, imaging device 100 may update the display and/or visual guide to indicate a movement that corrects the exact distance at which to image the object. For instance, the visual guide may present a wireframe of the object or object type, and may further provide an instruction to move imaging device 100 two feet closer to the object in order to correctly align the distance at which the object is to be imaged.

Gyroscope 204 may measure the tilt, roll, and/or yaw of imaging device 100. The measurements from gyroscope 204 may be compared against a tilt, roll, and/or yaw that is defined or the selected visual guide, and/or may be compared against the angle and orientation of the visual guide. Imaging device 100 may update the display and/or visual guide to indicate an amount by which the camera of imaging device 100 is to be tilted, rotated, or otherwise oriented in order to correctly align the angle and/or orientation at which the object is to be imaged.

Accelerometer 206 may measure movement of imaging device 100. The measurements from accelerometer 206 may be used when capturing a video or a panoramic image of an object. For instance, imaging device 100 may update the display and/or visual guide to indicate whether movement of imaging device 100 should be sped up (e.g., accelerated) or slowed down (e.g., decelerated) in order to properly capture a panoramic video or image of the object.

Lidar 202 and/or altimeter 208 may measure a height of imaging device 100. Based on the measurement from lidar 202 and/or altimeter 208, and the difference between the measurement and a desired height that is specified for a selected visual guide, imaging device 100 may update the display and/or visual guide to indicate a height correction (e.g., raising or lowering of imaging device 100) for aligning the exact height at which imaging sensor 210 is to capture or image the object.

In some embodiments, imaging sensor 210 may be used to update the visual guide presentation. For instance, the visual guide may specify imaging a vehicle at a height that is parallel to the vehicle's headlight. Imaging device 100 may perform a real-time analysis of the images from imaging sensor 210 in order to differentiate the headlight from other vehicle components, may determine a position of imaging sensor 210 relative to the detected headlight, and may indicate a movement by which to align imaging sensor 210 with the headlight.

In some embodiments, imaging device 100 may present a selected visual guide and textual instruction within the display for raising, lowering, tilting, rotating, angling, and/or otherwise manipulating a position and/or orientation of imaging sensor 210 in order to align an object that is to be imaged with the selected visual guide. In some other embodiments, imaging device 100 may present the selected visual guide with graphical elements for the alignment manipulations. In some such embodiments, the graphical elements may provide step-by-step instruction, and imaging device 100 may progress to a next step when the manipulation specified for a previous step is determined to be completed based on the measurements and/or outputs from the one or more sensors.

Figure 3:
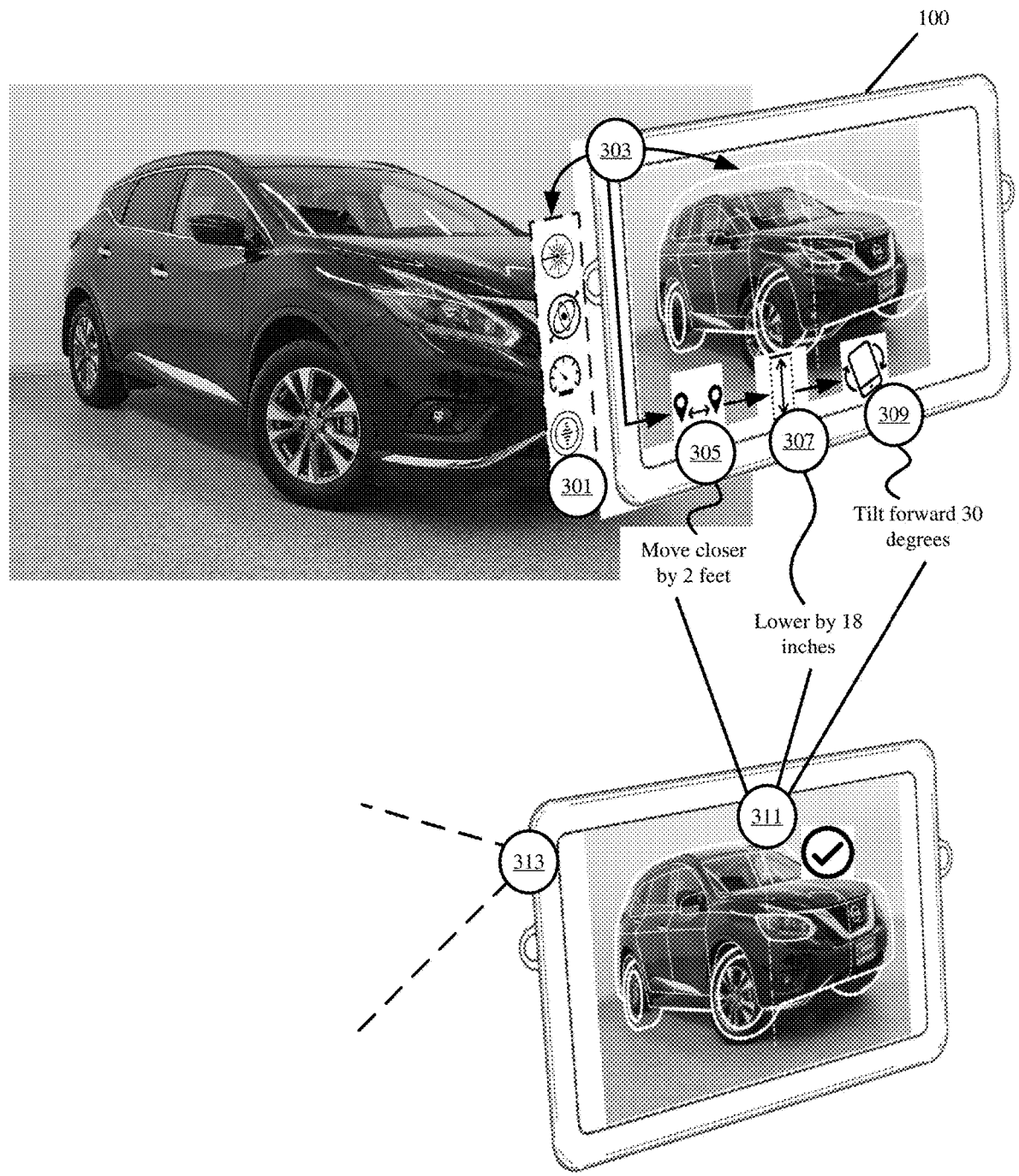
FIG. 3 illustrates an example of integrating output from the sensors of the imaging device as part of the visual guide presentation in accordance with some embodiments presented herein.

FIG. 3 illustrates an example of integrating output from sensors of imaging device 100 as part of the visual guide presentation in accordance with some embodiments presented herein. As shown in FIG. 3, imaging device 100 may obtain (at 301) output from one or more of sensors 202, 204, 206, 208, 210, and/or other sensors of imaging device 100, and may integrate the sensor output with the presentation of visual guide 102.

Integration of the sensor output with the presentation of visual guide 102 may include imaging device 100 computing (at 303) precise deviations between the positioning of object in the scene and/or field-of-view of imaging sensor 210, as determined from the obtained (at 301) sensor output, relative to specified positioning for visual guide 102. Imaging device 100 may modify the user interface to provide commands and/or instructions with which to correct the deviations between the object and visual guide 102. Imaging device 100 may continue to receive output from sensors 202-210 in order to monitor movements of imaging device 100, adjust the commands and/or instructions based on a real-time tracking of the movements, and/or verify when each command and/or instruction is successfully completed before providing a next command and/or instruction to correctly align the object in the imaging sensor 210 field-of-view and visual guide 102.

As shown in FIG. 3, imaging device 100 may provide (at 305) a first instruction to move away from the object by two feet based on a distance measurement obtained from lidar 202 and a particular distance that is specified for visual guide 102. In other words, the measured distance of the object differs than the particular distance that is specified for visual guide 102.

Imaging device 100 may verify that the distance correction is successfully performed based on additional output from lidar 202, and may provide (at 307) a second instruction to lower imaging device 100 by 18 inches. Imaging device 100 may verify that the height correction is successfully performed based on additional output from one or more of lidar 202, altimeter 208, and/or another sensor, and may provide (at 309) a third instruction to tilt imaging device forward by 30 degrees. Imaging device 100 may verify that the orientation correction is successfully performed based on output from gyroscope 204, may change (at 311) the presentation of the visual guide to indicate that the object is properly aligned with the visual guide based on successful completion of the first, second, and third instructions, and may activate (at 313) imaging sensor 210 automatically to capture an image of the object once the proper alignment is achieved.

Even with proper alignment and orientation of the imaged objects to the respective visual guides, variations in time, location, background, camera settings (e.g., aperture, focal distance, ISO setting, etc.), the object (e.g., an image of a white vehicle versus an image of a blue vehicle), and/or other differences that are unrelated to the alignment of the object with the visual guide may introduce inconsistencies in the images. The inconsistencies may manifest in terms of different coloring, brightness, lighting, contrast, specular highlights, shadows, tint, exposure, and/or other visual characteristics that affect the rendering of the object or image.

The postprocessing system may operate in conjunction with imaging device 100 and/or other imaging devices to correct for positional and/or visual characteristic inconsistencies in images of the same object or images of related objects that are presented in a gallery or adjacent to one another. For instance, the postprocessing system may crop, level, resize, distort, rotate, skew, reposition, and/or reorient an object within an image to correct for positional inconsistencies between the object and the visual guide used to capture the image and/or to correct for positional inconsistencies with other images of the same object or object type (e.g., related objects that are of a common classification). The postprocessing system may also dynamically adjust visual characteristics of an image for consistency with the visual characteristics from a particular set of edited images for the object or the object type.

In some embodiments, the postprocessing image adjustments may be based on models that are developed using AI/ML. In some such embodiments, a different model that specifies desired positioning and visual characteristics for a postprocessed image may be generated for each visual guide, each imaged object, and/or each class or type of objects.

For instance, the AI/ML may receive and may be trained using a set of edited images or images that are deemed to have desired positional and/or visual characteristics for an object or object type. The AI/ML may analyze the training set of edited images for a particular object or object type, may compare object positioning and/or placement between the training set of edited images, and/or may generate a first model that specifies consistent positioning and/or placement (e.g., sizing, cropping, framing, etc.) for the objects within the training set of edited images. The processing system may subsequently crop, resize, distort, rotate, skew, reposition, and/or reorient an object within an image to correct for positional inconsistencies between the object and the first model that was trained on the positioning of the same object or other objects of a same type in a particular edited set of images that were taken using the same visual guide.

Additionally, the AI/ML may analyze the training set of edited images for a particular object or object type, may compare visual characteristics between the training set of edited images, and/or may generate a second model that maps consistent visual characteristics across the training set of edited images. The postprocessing system may dynamically adjust visual characteristics of an image for consistency with the visual characteristics from the second model that is trained on a particular set of edited images for the object or object type appearing in the image.

Figure 4:
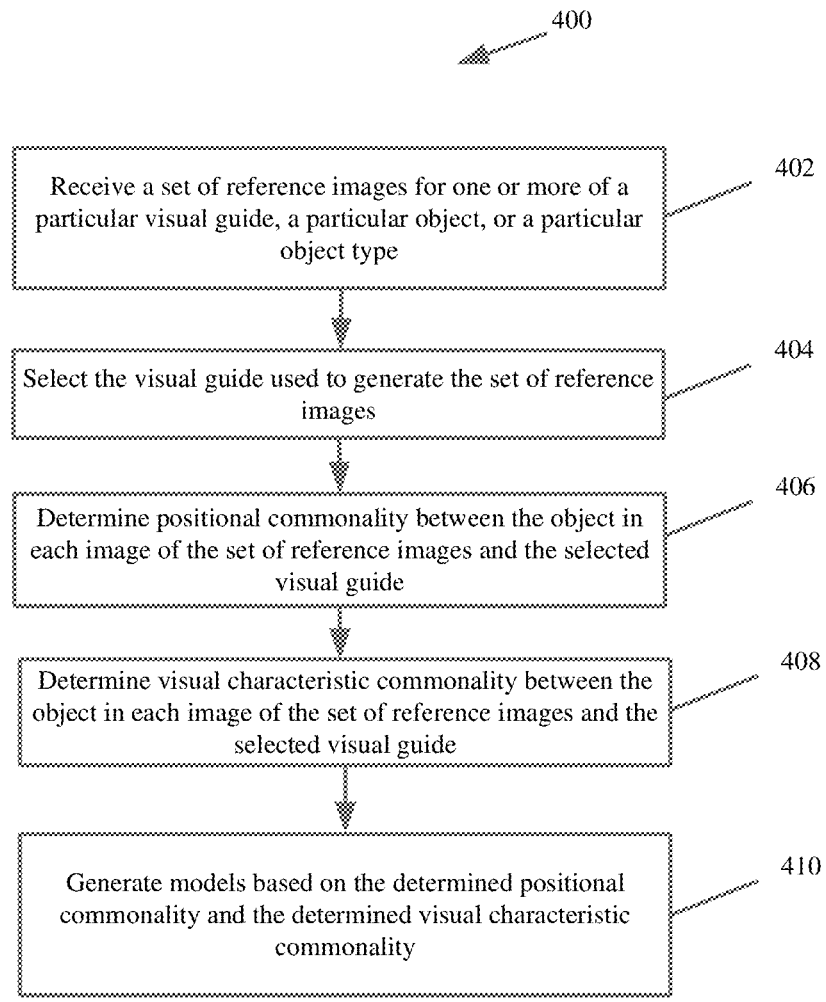
FIG. 4 presents a process for training models based on positional and visual characteristic consistency in accordance with some embodiments presented herein.

FIG. 4 presents a process 400 for training AI/ML models based on positional and visual characteristic consistency in accordance with some embodiments presented herein. Process 400 may be implemented by AI/ML components of the image postprocessing system.

Process 400 may include receiving (at 402) a set of reference images for one or more of a particular visual guide, a particular object, or a particular object type. For instance, the set of reference images may include two or more images that were taken using the same wireframe (e.g., visual guide) and/or that include the same object or related objects of a particular object type. Each image of the set of reference images may be a separate file, and the images may be encoded using different image formats. Each image of the set of reference images may have been manually adjusted by one or more editors, or automatically adjusted via a set of scripts and/or the postprocessing system. In any case, the set of reference images may include desired positioning, sizing, framing, angling, and/or other placement of a target object relative to the same visual guide, and may further include desired coloring, lighting, exposure, highlights, temperature, sharpness, contrast, brightness, tint, shadows, reflectivity, and/or other visual characteristics for the target object that is imaged using the same visual guide.

Process 400 may include selecting (at 404) the visual guide that was used to generate each image from the set of reference images. In some embodiments, the selection (at 404) of the visual guide may be based on the image metadata. For instance, imaging device 100 may include an identifier in the metadata of each image from the set of reference images, wherein the identifier identifies the same visual guide. The identifier may specify a name or value that corresponds to the visual guide. The metadata may be stored in the header of the image file or may otherwise be tagged or linked to the image file. In some embodiments, the selection (at 404) of the visual guide may be based on image analysis. For instance, the AI/ML may analyze each edited image from the set of reference images to determine the object or object type that is at the center or that is the focus of each image, and may select (at 404) the visual guide in response to determining the same object or same object type appearing in each of the set of reference images. Alternatively, the AI/ML may selectively overlay different visual guides over the object at the center of each image from the set of reference images, and may select (at 404) the visual guide that matches most closely to the shape and/or size of the object. In some such embodiments, the size of the visual guide may be adjusted based on the resolution of the image. For instance, the visual guides may be sized for presentation on a 1080×480 display, and may be decreased in size when compared to an object within an image with a 640×480 resolution.

Process 400 may include determining (at 406) positional commonality between the object in each image of the set of reference images and the selected (at 404) visual guide. Determining (at 406) the positional commonality may include identifying consistent positioning, sizing, cropping, framing, leveling, offsetting, angles, and/or other placement of the imaged object in each edited image relative to the visual guide.

In some embodiments, the postprocessing system may determine (at 406) the positional commonality by locating a center point of the selected visual guide and the center point of each image in the set of reference images. The postprocessing system may place the center point of the selected visual guide at the center point of each image, may compare positional properties of the imaged object in each image to the selected visual guide, and may derive values for the positional commonality. For instance, the postprocessing system may determine that the imaged object in 70% of the edited images is slightly smaller than the visual guide and is offset to the left of the visual guide by a particular amount. These deviations from the visual guide may correspond to the positional commonality.

In some embodiments, determining (at 406) the positional commonality may be based on computed averages or means for the pos positioning, sizing, cropping, framing, leveling, offsetting, angles, and/or other placement of the image object in each image of the set of reference images. For instance, the object that is imaged in each of the set of reference images may have slightly different positioning, sizing, angling, and/or other positional attributes relative to the selected (at 404) visual guide than the object in the other images of the set of reference images. Accordingly, the positional commonality may be determined (at 406) based on the average positioning, sizing, cropping, framing, leveling, offsetting, angles, and/or other positional attributes of the object in each image of the set of reference images relative to the selected (at 404) visual guide.

Process 400 may include determining (at 408) visual characteristic commonality between the object in each image of the set of reference images and the selected (at 404) visual guide. Determining (at 408) the visual characteristic commonality may include identifying consistent coloring, lighting, exposure, highlights, temperature, sharpness, contrast, brightness, tint, shadows, reflectivity, and/or other visual aspects at different parts of the imaged object in each of the set of reference images.

In some embodiments, the postprocessing system may determine (at 408) the visual characteristic commonality by placing and/or inserting the selected (at 404) visual guide at the center point of each image, comparing visual characteristics in the reference images at different parts of the visual guide, and/or deriving values for the visual characteristic commonality. For instance, the selected (at 404) visual guide may include a wireframe for a sedan, and the set of reference images may include images of different sedans. The postprocessing system may determine (at 408) visual characteristic commonality when the set of reference images have increased or a particular brightness at the part of the visual guide that corresponds to the sedan hood, have shadows of a particular length and darkness to one side of the visual guide, have specular highlights at edges or corners of the visual guide, have colors with certain intensities or values at different parts of the visual guide, and/or have other visual consistency in other parts of the reference images that align with other parts of the visual guide.

In some embodiments, determining (at 408) the visual characteristic commonality may be based on computed averages or means for the visual characteristics of the imaged object in each image of the set of reference images at different parts of the visual guide. For instance, the object that is imaged in each of the set of reference images may be a different sedan, and the selected (at 404) visual guide may include a sedan wireframe. The visual characteristic commonality may be determined (at 408) based on the average coloring, brightness, lighting, contrast, specular highlights, shadows, tint, exposure, and/or other visual aspects of the imaged sedans in each of the set of edited images at different parts of the selected (at 404) visual guide. In other words, the postprocessing system may determine a first brightness for the hood of a first sedan in a first image of the set of edited images, a second brightness for the hood of a second sedan in a second image of the set of edited images, and determine (at 408) the visual characteristic commonality for brightness at the hood of a sedan from an average of the first brightness and the second brightness. The postprocessing system may similarly compute the commonality for other visual characteristics at the same part of the visual guide (e.g., the hood of the sedan) or for the visual characteristics at other parts of the visual guide (e.g., the passenger door, the driver door, the roof, the front wheels, the front bumper, etc.). In some embodiments, the postprocessing system may determine (at 408) the visual characteristic commonality for each section of the selected (at 404) visual guide that is fully enclosed by the wireframe, outline, or other boundary. In other words, the postprocessing system may use the selected (at 404) visual guide to partition each image of the set of reference images, and may determine (at 408) the visual characteristic commonality across the set of reference images at each of the partitioned regions of the images via detected similar visual characteristics, computed averages, and/or other derived values from the visual characteristics at the same section in the set of reference images.

Process 400 may include generating (at 410) one or more models for one or more of the selected (at 404) visual guide, the object in the set of reference images, or the object type in the set of reference images based on the determined (at 406) positional commonality and the determined (at 408) visual characteristic commonality. In some embodiments, a first positional model may be generated (at 410) based on the determined (at 406) positional commonality, and a second visual characteristic model may be generated (at 410) based on determined (at 408) visual characteristic commonality for each visual guide, object, and/or object type.

In some embodiments, each generated (at 410) model may be defined relative to a different visual guide and/or may be linked to that visual guide, wherein each visual guide is defined for a different object or object type. In other words, a different model may be generated (at 410) for each visual guide, object, and/or object type. For instance, a first model may specify consistent positioning for a first object type relative to a first visual guide based on the positional commonality that is determined (at 406) from a first set of reference images involving the first object type, and a second model may specify consistent positioning for a second object type relative to a second visual guide based on the positional commonality that is determined (at 406) from a second set of reference images involving the second object type.

More specifically, the positional model that is generated (at 410) for a particular visual guide may specify the desired size, distance, height, angle, orientation, framing, cropping, leveling, alignment, background, and/or other spatial attributes for the particular object or the particular type of the object that is imaged and/or captured using that particular visual guide. In other words, the positional model may adjust the particular visual guide to be defined with the desired size, distance, height, angle, orientation, framing, cropping, leveling, alignment, background, and/or other spatial attributes. The positional model may then be used to detect and correct for inconsistencies between the desired size, distance, height, angle, orientation, framing, cropping, leveling, alignment, background, and/or other spatial attributes defined for the particular visual guide and one or more images of the particular object or the particular object type that are imaged or captured using that particular visual guide.

Similarly, the visual characteristic model that is generated (at 410) for a particular visual guide may specify the desired coloring, brightness, lighting, contrast, specular highlights, shadows, tint, exposure, and/or other rendered aspects for different parts of a particular object or the particular type of the object that is imaged and/or captured using that particular visual guide. In other words, the visual characteristic model may define the different parts of the particular visual guide to have the desired coloring, brightness, lighting, contrast, specular highlights, shadows, tint, exposure, and/or other rendered aspects. The visual characteristic model may then be used to detect and correct for inconsistencies between the desired coloring, brightness, lighting, contrast, specular highlights, shadows, tint, exposure, and/or other rendered aspects defined for different parts of the particular visual guide and the corresponding parts of one or more images of the particular object or the particular object type that are imaged or captured using that particular visual guide.

Based on process 400, the postprocessing system may learn how to automatically and consistently position objects and consistently adjust visual characteristics of those objects across different images in order to produce a consistent presentation of a particular object or object type across different images. The postprocessing system may continually run process 400 in order to improve or update the models and provide for greater consistency across different images that are captured using the same visual guide, images that capture the same object (e.g., images of the same make and model vehicle), and/or images that capture the same object type (e.g., images of different make and model sedan). In some embodiments, the postprocessing system may rerun process 400 with reference images that are generated by the postprocessing system using the models derived from previous sets of reference images.

Figure 5:
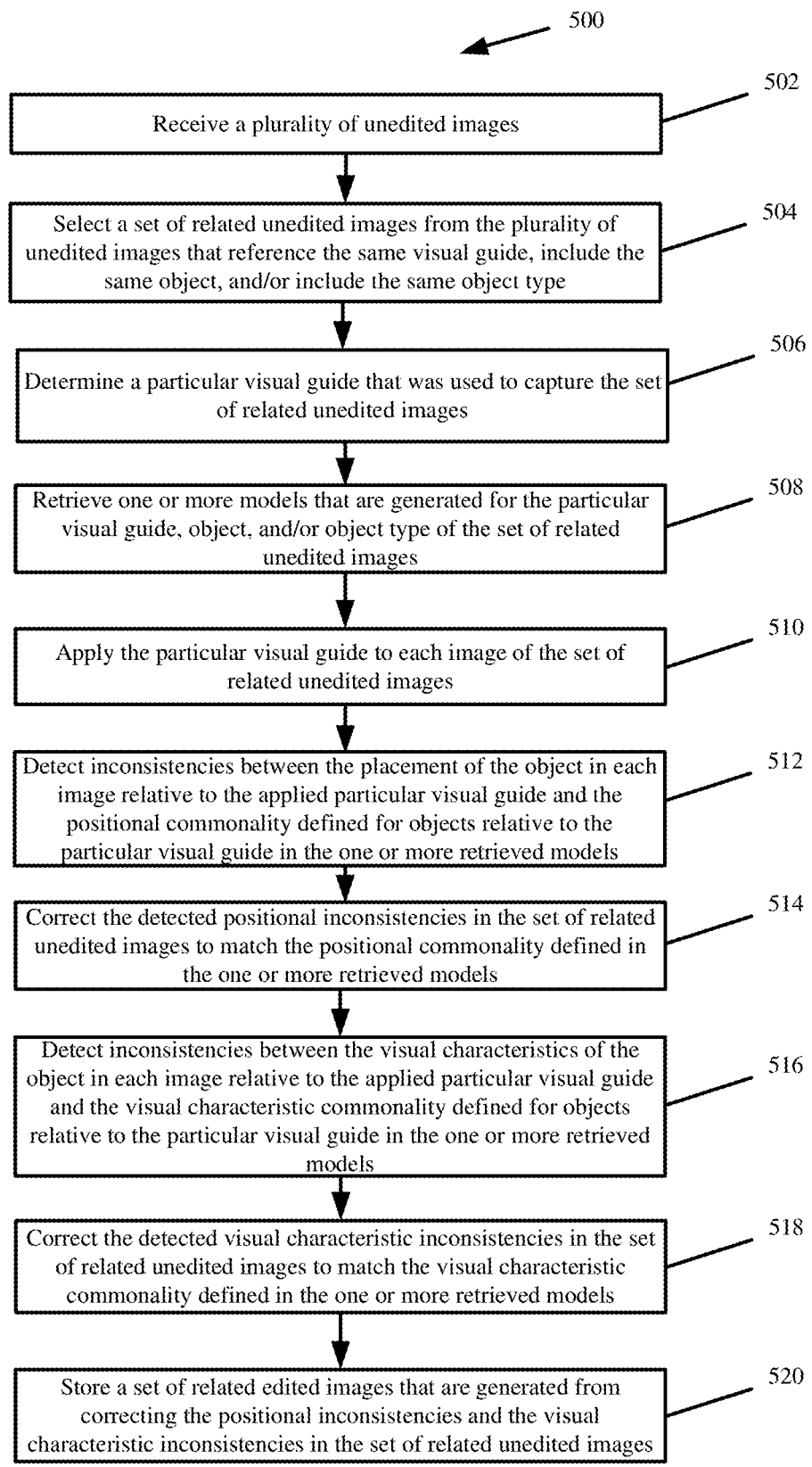
FIG. 5 presents a process for postprocessing images based on the visual guides and the corresponding models that are generated for those visual guides in accordance with some embodiments presented herein.

FIG. 5 presents a process 500 for postprocessing images based on the visual guides and the corresponding AI/ML models that are generated for those visual guides in accordance with some embodiments presented herein. Process 500 may be performed by the postprocessing system.

Process 500 may include receiving (at 502) a plurality of unedited images. The plurality of unedited images may include images that are captured using imaging device 100 and/or another imaging device. The plurality of unedited images may include other images that were manually edited or edited without reliance on the AI/ML trained models used by the postprocessing system. The postprocessing system may directly receive (at 502) the plurality of unedited images from imaging device 100, or may receive (at 502) the plurality of unedited images from a content management system ("CMS"), database, or another image repository.

Process 500 may include selecting (at 504) a set of related unedited images from the plurality of unedited images. The selection (at 504) may include identifying two or more images from the plurality of unedited images that were captured using the same visual guide, that include the same object, and/or that include the same object type. The selection (at 504) may include scanning the metadata of the plurality of unedited images to identify the set of related unedited images that were captured using the same visual guide, that include the same object, and/or that include the same object type. Alternatively, the selection (at 504) may include analyzing each of the images to identify the object or object type that is captured in each of the images.

Process 500 may include determining (at 506) a particular visual guide that was used to capture the set of related unedited images. The determination (at 506) may be based on the metadata from each image of the set of related unedited images, or from analyzing the set of related unedited images to determine the imaged object or object type therein.

Process 500 may include retrieving (at 508) one or more models that are generated for the particular visual guide, object, and/or object type of the set of related unedited images. In some embodiments, the one or more models may be linked to the particular visual guide used to capture the set of related unedited images. In some embodiments, the one or more models may be linked to the object or object type identified within the set of related unedited images. Retrieving (at 508) the one or more models may include obtaining a set of positional adjustments and/or a set of visual characteristic adjustments that are defined within the one or more models relative to the particular visual guide.

Process 500 may include applying (at 510) the particular visual guide to each image of the set of related unedited images. Applying (at 510) the particular visual guide may include detecting a center point of the particular visual guide, detecting a center point of each image or the center point of the object within each image, scaling the particular visual guide according to the resolution of each image, and overlaying or analyzing each image with the center point of the particular visual guide placed at the center point of the image or the center point of the object within the image.

Process 500 may include detecting (at 512) inconsistencies between the placement of the object in each image relative to the applied (at 510) particular visual guide and the positional commonality defined for objects relative to the particular visual guide in the one or more retrieved (at 508) models. In some embodiments, detecting (at 512) the inconsistencies may include identifying deviations between the size, distance, height, angle, orientation, framing, cropping, leveling, alignment, background, and/or other placement of the object in each of the set of related unedited images and the particular visual guide as adjusted by the one or more models. For instance, a first image may capture a first object at a size that is slightly larger than the particular visual guide defined from the one or more models, and the postprocessing system may detect (at 512) a size inconsistency based on the first object in the first image appearing larger than the particular visual guide. Similarly, a second image may capture a second object that is shifted to left of the particular visual guide, the positional commonality may define a framing that places the objects a particular distance to the right of the particular visual guide, and the postprocessing system may detect (at 512) a framing inconsistency based on the second object in the second image being shifted to the left of the particular visual guide instead of the particular distance to the right of the particular visual guide.

Process 500 may include correcting (at 514) the positional inconsistencies that are detected (at 512) within the set of related unedited images to match the positional commonality defined in the one or more retrieved (at 508) models. Correcting (at 514) the positional inconsistencies may include adjusting the size, angle, framing, cropping, leveling, and/or other positioning of the imaged object within each image to correct for deviations with the object size, angle, framing, cropping, leveling, and/or other positioning that is defined for the particular visual guide in the one or more retrieved (at 508) models. For instance, correcting (at 514) the positional inconsistencies may include resizing an image or an object within an image to match the size of the particular visual guide that is adjusted according to the positional commonality from the one or more models, moving an image or an object within an image to match the position of the particular visual guide that is adjusted based on the positional commonality from the one or more models, skewing, tilting, angling, and/or otherwise transforming an image or an object within an image to match the adjusted orientation of the particular visual guide defined according to the positional commonality from the one or more models.

Process 500 may include detecting (at 516) inconsistencies between the visual characteristics of the object in each of the set of related unedited images relative to the applied (at 510) particular visual guide and the visual characteristic commonality defined for objects relative to the particular visual guide in the one or more retrieved (at 508) models. Detecting (at 516) the visual characteristic inconsistencies may include identifying deviations between the coloring, lighting, exposure, highlights, temperature, sharpness, contrast, brightness, tint, shadows, reflectivity, and/or other rendered aspects at different parts of each image of the set of related unedited images and visual characteristics for different parts of the particular visual guide as defined by the one or more models. For instance, a first image may capture a particular side of a red object with a first red coloring based on the lighting at the time the first image is captured, the visual characteristic commonality in the one or more models for that particular side of the particular visual guide may specify a darker red coloring for the red object in the model, and the postprocessing system may detect (at 516) a color inconsistency based on the first object in the first image appearing with a lighter red color than the red color that is specified for the particular side of the particular visual guide (e.g., the particular side of an object that is aligned with the particular side of the particular visual guide) in the one or more models. Similarly, a second image may capture an object with a first amount of brightness, the visual characteristic commonality in the one or more models may define a second amount of brightness for objects captured within the particular visual guide, and the postprocessing system may detect (at 516) a brightness inconsistency based on the object in the second image appearing lighter or darker (e.g., different brightness) than the consistent brightness value that is set for objects imaged within the particular visual guide.

Process 500 may include correcting (at 518) the visual characteristic inconsistencies that are detected (at 516) within the set of related unedited images to match the visual characteristic commonality defined in the one or more retrieved (at 508) models. Correcting (at 518) the visual characteristic inconsistencies may include adjusting the coloring, lighting, exposure, highlights, temperature, sharpness, contrast, brightness, tint, shadows, reflectivity, and/or other rendered aspects at different parts of the object within each image to correct for deviations with the coloring, lighting, exposure, highlights, temperature, sharpness, contrast, brightness, tint, shadows, reflectivity, and/or other rendered aspects that are defined for different parts of the particular visual guide in the one or more the retrieved (at 508) models. For instance, correcting (at 514) the visual characteristic inconsistencies may include adjusting the contrast of an image or an object within an image to match the contrast that is defined in the one or more models, adding or removing specular highlights at different parts of an image or an object within an image to match the specular highlights defined by the one or more models at different parts of the particular visual guide, and/or changing the coloring and brightness of a background surrounding an object within an image to match the coloring and brightness defined for a background in the one or more models for that particular visual guide.

Process 500 may include storing (at 520) a set of related edited images that are generated from correcting (at 514) the positional inconsistencies and correcting (at 518) the visual characteristic inconsistencies in the set of related unedited images according to the positional commonality and visual characteristic commonality defined in the one or more retrieved (at 508) models. In some embodiments, the postprocessing system may store (at 520) the set of related edited images with the original set of related unedited images, or may replace the original set of related unedited images with the set of related edited images. The postprocessing system may store (at 520) the set of related edited images to a CMS, database, or other image repository from which images in one or more websites may be directly populated or updated.

Figure 6:
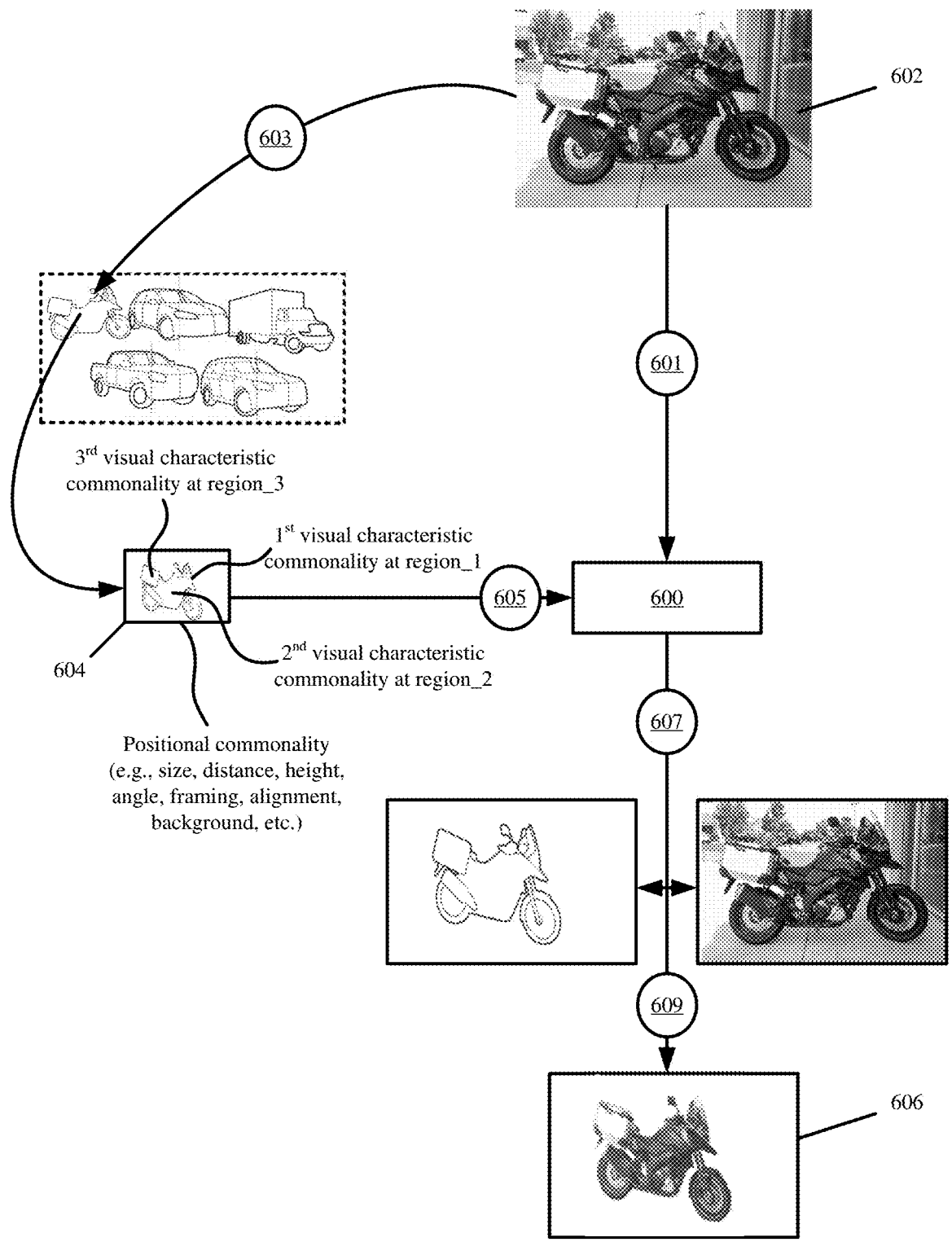
FIG. 6 illustrates an example of postprocessing an image to correct for positional and/or visual characteristic inconsistencies with one or more models in accordance with some embodiments presented herein.

FIG. 6 illustrates an example of postprocessing an image to correct for positional and/or visual characteristic inconsistencies with one or more models in accordance with some embodiments presented herein. As shown in FIG. 6, postprocessing system 600 may receive (at 601) an unedited image 602.

Postprocessing system 600 may determine (at 603) the particular visual guide, object, or object type associated with unedited image 602. As noted above, postprocessing system 600 may inspect the metadata or header of unedited image 602, or may analyze unedited image 602 to determine (at 603) the particular visual guide, object, or object type associated with unedited image 602.

Postprocessing system 600 may retrieve (at 605) particular model 604 from a plurality of different trained models based on the determined (at 603) particular visual guide, object, or object type associated with unedited image 602. For instance, as shown in FIG. 6, postprocessing system 600 may determine that unedited image 602 is for a particular motorcycle make and model based on the image metadata or analysis of the object within unedited image 602. Postprocessing system 600 may determine (at 603) that the particular visual guide is associated with that particular motorcycle make and model or the type of motorcycle represented by that make and model (e.g., a cruiser type), and may retrieve (at 605) the particular model 604 that includes the desired positional commonality and the desired visual characteristic commonality for images of that particular motorcycle make and model or that type of motorcycle.

Postprocessing system 600 may use particular model 604 to identify (at 607) positional inconsistencies between the object in unedited image 602 and the positional commonality that is defined in particular model 604. For instance, particular model 604 may specify a set of positional adjustments that change the size, orientation, and/or other spatial properties of the particular visual guide that was used to capture or that is associated with unedited image 602. Accordingly, postprocessing system 600 may compare the size, orientation, and/or other spatial properties of the object in unedited image 602 to the specified size, orientation, and/or other spatial properties specified in particular model 604. In some embodiments, postprocessing system 600 may introduce the particular visual guide adjusted with the positional commonality from particular model 604 in unedited image 602, and may identify one or more positional inconsistencies with particular model 604 based on the size, orientation, and/or other spatial properties of the object in unedited image 602 relative to the adjusted particular visual guide and/or desired sizing, orientation, and/or other spatial properties specified in particular model 604.

Postprocessing system 600 may also use particular model 604 to identify (at 607) visual characteristic inconsistencies between the object in unedited image 602 and the visual characteristic commonality that is defined in particular model 604. To identify (at 607) the visual characteristic inconsistencies, postprocessing system 600 may compare the visual characteristics of the object against desired visual characteristics that are defined at corresponding parts of the adjusted particular visual guide defined by particular model 604.

Postprocessing system 600 may correct (at 609) the positional inconsistencies and the visual characteristic inconsistencies between unedited image 602 and particular model 604. Correcting (at 609) the positional inconsistencies may include reducing the size of the object in unedited image 602 relative to the adjusted size specified by particular model 604 (e.g., size of the adjusted particular visual guide defined by particular model 604), cropping unedited image 602 to remove parts of unedited image 602 that are outside the adjusted particular visual guide defined by particular model 604, shifting a position of the object to match the off-center position in particular model 604, and/or reorienting the object to align with the adjusted orientation specified by particular 604 (e.g., skew, rotate, and/or otherwise transform the object in unedited image 602 to become aligned with the adjusted particular visual guide of particular model 604). Correcting (at 609) the visual characteristic inconsistencies may include increasing the brightness of the object in unedited image 602 based on particular model 604 specifying a different brightness level for objects within the particular visual guide than the brightness level of the object in unedited image 602, and/or removing or changing the background of unedited image 602 to match the background specified around the particular visual guide by particular model 604.

Postprocessing system 600 may generate edited image 606 to correct the positional inconsistences and the visual characteristic inconsistencies that are detected in unedited image 602. Postprocessing system 600 may store edited image 606 with unedited image 602, or may replace unedited image 602 with edited image 606.

In this manner, postprocessing system 600 may output a set of images of the particular motorcycle make and model or motorcycle type that are consistent with one another despite using different camera settings, lighting, backgrounds, positioning, angles, framing, and/or other positional or visual characteristic differences to capture each of the set of images. Specifically, postprocessing system 600 may modify the set of images so that each image in the set of images has positional commonality and visual characteristic commonality with every other image despite the original images differing in one or more of these respects.

Figure 7:
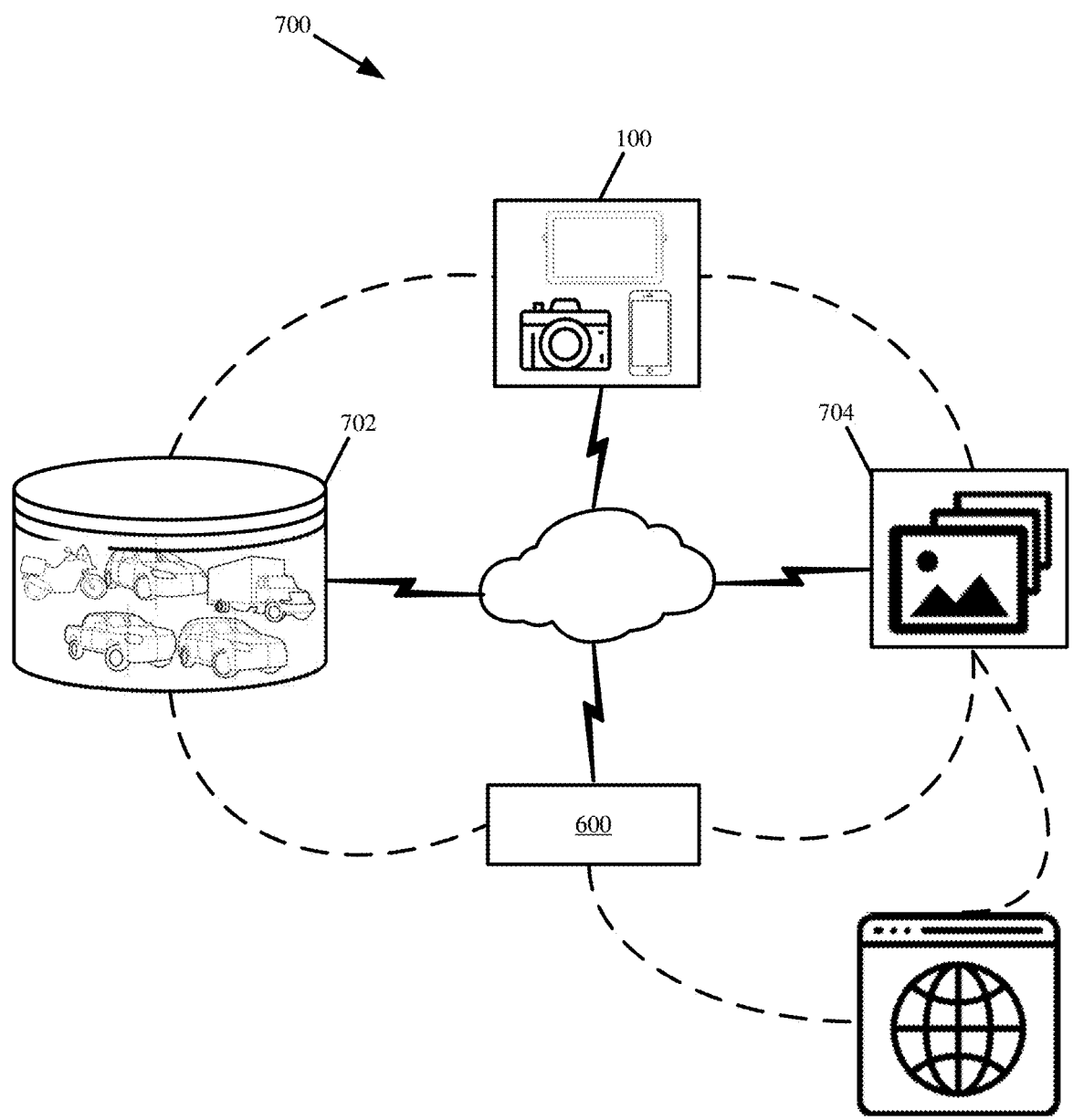
FIG. 7 illustrates an example architecture for generating consistent images of objects in accordance with some embodiments presented herein.

FIG. 7 illustrates an example architecture 700 for generating consistent images of objects in accordance with some embodiments presented herein. Example architecture 700 may include visual guide database 702, image repository 704, one or more imaging devices 100, and postprocessing system 600.

Visual guide database 702, image repository 704, imaging device 100, and postprocessing system 600 may be connected and may communicate with one another via a data network using one or more network protocols (e.g., HyperText Transfer Protocol ("HTTP"), Transmission Control Protocol ("TCP"), Internet Protocol ("IP"), etc.). In some such embodiments, one or more of visual guide database 702, image repository 704, imaging device 100, and postprocessing system 600 may include separate devices that run on distinct hardware and that correspond to different network nodes. In some other embodiments, one or more of visual guide database 702, image repository 704, imaging device 100, and postprocessing system 600 may be integrated as one device running on shared hardware.

Visual guide database 702 may store the different visual guides for the consistent imaging of different objects and/or object types. For example, visual guide database 702 may store visual guide wireframes from different vehicles, aircraft, boats, furniture, electronics, clothing, produce, and/or other products.

In some embodiments, visual guide database 702 may include a network accessible node from which imaging devices 100 and/or postprocessing system 600 may request and retrieve different visual guides for different objects or object types. In some other embodiments, visual guide database 702 may be stored in local memory or storage of imaging devices 100 and/or postprocessing system 600.

Image repository 704 may include a network accessible site, database, or storage to which imaging devices 100 may upload captured images, and/or to which postprocessing system 600 may enter images that have been edited for positional and/or visual characteristic consistency with one or more models. Image repository 704 may also serve as a site from which different servers and/or clients pull images in order to populate different websites.

Imaging devices 100 may include cameras or devices with a display, an imaging sensor, and/or other sensors. Imaging devices 100 may obtain visual guides from visual guide database 702, and may present a visual guide for a particular object or object type on the display or in a viewfinder to provide a visual reference with which a user may align and consistently image the particular object or object type. The sensors of imaging device 100 may integrate with the presented visual guide, and may provide direction and/or control for properly aligning the presented visual guide with the object being photographed. Imaging devices 100 may wirelessly transmit the captured images to image repository 704 and/or postprocessing system 600.

Postprocessing system 600 may include one or more devices for automatically adjusting and/or editing images based on the AI/ML trained models. Postprocessing system 600 may be trained based on different sets of edited or reference images, and may generate one or more models based on the training. Postprocessing system 600 may obtain unedited images from imaging devices 100 or image repository 704, and may adjust the unedited images to correct any inconsistencies in the object positioning and/or visual characteristics between the unedited images and the generated models. Postprocessing system 600 may store the processed and edited images in image repository 704 or may directly provide the edited images to different servers or devices that use the edited images when rendering a website or providing another service over a data network.

Figure 8:
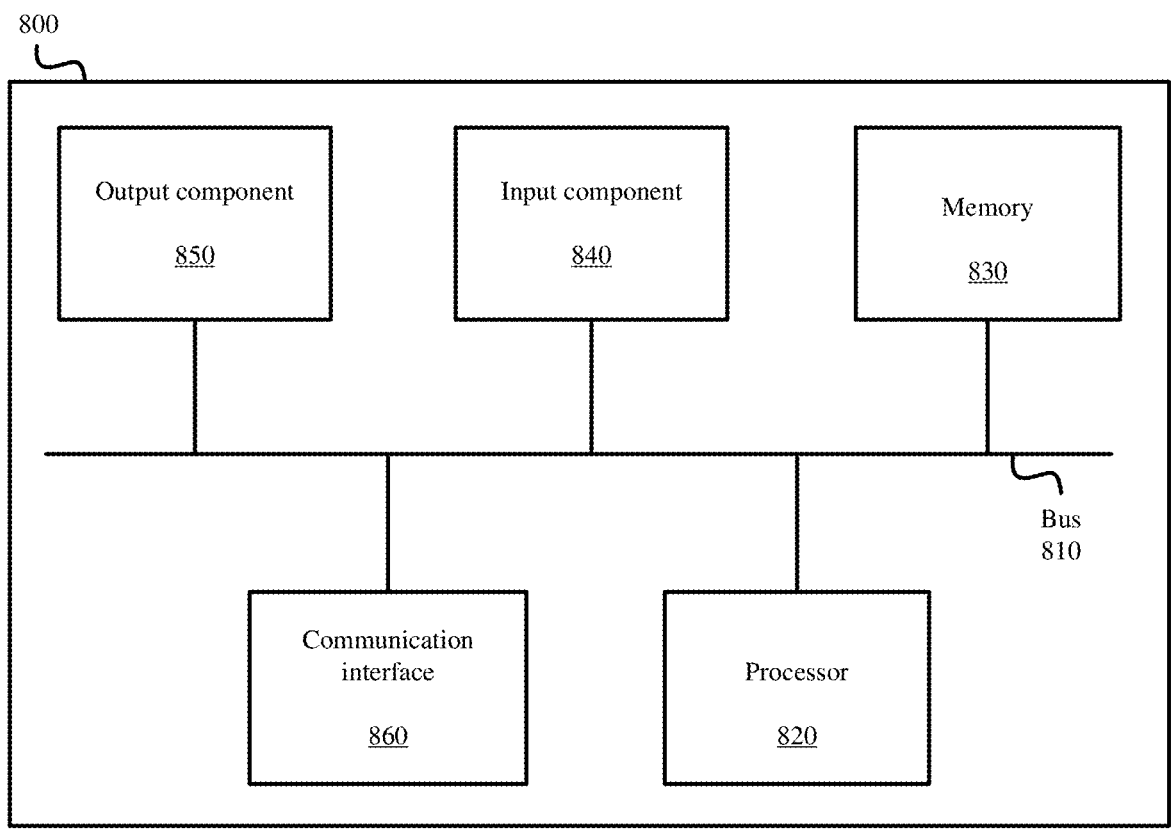
FIG. 8 illustrates example components of one or more devices, according to one or more embodiments described herein.

FIG. 8 is a diagram of example components of device 800. Device 800 may be used to implement one or more of the devices or systems described above (e.g., imaging device 100, postprocessing system 600, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a particular image of a particular object, wherein the particular image is an unedited image of the particular object as captured by an imaging device;
   selecting a particular model that defines one or more of positional commonality or visual characteristic commonality between a set of images of the particular object or a particular object type that includes the particular object;
   determining one or more deviations between the particular object in the particular image and the particular model in response to differences detected from comparing positioning of the particular object in the particular image to the positional commonality specified in the particular model, or comparing visual characteristics of the particular image to the visual characteristic commonality specified in the particular model; and
   generating an edited image from the unedited image by automatically correcting, without user input, the one or more deviations, wherein correcting the one or more deviations comprises generating the edited image with the particular object having one or more of a different size, orientation, positioning, coloring, lighting, exposure, highlights, temperature, sharpness, contrast, brightness, tint, shadow, or reflectivity than the particular object of the unedited image.

2. The method of claim 1 further comprising:
   determining a particular visual guide from a plurality of visual guides that is associated with the particular object in the particular image, wherein the particular visual guide comprises a wireframe of the particular object or the particular object type.

3. The method of claim 2 further comprising:
   defining the positional commonality for the particular model relative to one or more of a size, orientation, and positioning of the particular visual guide; and
   wherein correcting the one or more deviations further comprises adjusting one or more of the size, orientation, and positioning of the particular object in the particular image to match the size, orientation, and positioning of the particular visual guide.

4. The method of claim 2 further comprising:
   defining different visual characteristic commonality for the particular model at different regions of the particular visual guide, wherein said defining comprises defining one or more of a first coloring, lighting, exposure, highlight, temperature, sharpness, contrast, brightness, tint, shadow, or reflectivity for a first region of the particular visual guide, and a different second coloring, lighting, exposure, highlight, temperature, sharpness, contrast, brightness, tint, shadow, or reflectivity for a different second region of the particular visual guide; and
   wherein correcting the one or more deviations further comprises adjusting one or more of coloring, lighting, exposure, highlight, temperature, sharpness, contrast, brightness, tint, shadow, or reflectivity in a particular region of the particular object in the particular image to match coloring, lighting, exposure, highlight, temperature, sharpness, contrast, brightness, tint, shadow, or reflectivity at a corresponding region of the particular visual guide that overlaps with the particular region of the particular object.

5. The method of claim 1 further comprising:
overlaying a wireframe of the particular model over the particular object in the particular image; and
wherein correcting the one or more deviations further comprises detecting deviations between positioning of the wireframe and the particular object, and transforming the particular object in the particular image to align with the wireframe.

6. The method of claim 5 further comprising:
defining the positional commonality of the particular model by adjusting a size, orientation, and positioning of the wireframe based on a size, orientation, and common positioning of the particular object or objects of the particular object type in a set of reference images that does not include the particular image.

7. The method of claim 1 further comprising:
overlaying a wireframe of the particular model over the particular object in the particular image; and
wherein correcting the one or more deviations further comprises detecting deviations between visual characteristics defined for different regions of the wireframe and aligned regions of the particular object, and adjusting the visual characteristics of the particular image based on the deviations.

8. The method of claim 7 further comprising:
defining the visual characteristic commonality of the particular model by setting one or more of coloring, lighting, exposure, highlights, temperature, sharpness, contrast, brightness, tint, shadows, and reflectivity at the different regions of the wireframe based on common coloring, lighting, exposure, highlights, temperature, sharpness, contrast, brightness, tint, shadows, and reflectivity at corresponding regions of the particular object or objects of the particular object type in a set of reference images that does not include the particular image.

9. The method of claim 1 further comprising:
determining an average size, orientation, and positioning for objects in the set of images;
determining average coloring and brightness at different regions of the objects in the set of images; and
generating the particular model with the positional commonality defined based on said determining of the average size, orientation, and positioning, and with the visual characteristic commonality defined based on said determining of the average coloring and brightness.

10. The method of claim 1, wherein the particular model comprises:
the positional commonality defined as an outline of a desired size and orientation for the particular object or the particular object type;
a desired positioning of the outline within an image; and
different coloring, lighting, exposure, highlight, temperature, sharpness, contrast, brightness, tint, shadow, or reflectivity values for the visual characteristic commonality at different regions of the outline.

11. The method of claim 1 further comprising:
presenting a particular visual guide on a display of the imaging device;

aligning the particular object with the particular visual guide in the display; and
capturing the particular image in response to said aligning.

12. The method of claim 11, wherein the particular model comprises:
an adjusted visual guide with one or more of a size, shape, orientation, and positioning that is different than the particular visual guide; and
visual characteristics defined at different regions of the adjusted visual guide.

13. The method of claim 12, wherein determining the one or more deviations comprises:
detecting positional deviations based on differences in size, shape, orientation, and positioning between the particular object in the particular image and the adjusted visual guide; and
detecting visual characteristic deviations based on differences in the visual characteristics of the particular image and the visual characteristics defined at corresponding regions of the adjusted visual guide.

14. A device comprising:
one or more processors configured to:
receive a particular image of a particular object, wherein the particular image is an unedited image of the particular object as captured by an imaging device;
select a particular model that defines one or more of positional commonality or visual characteristic commonality between a set of images of the particular object or a particular object type that includes the particular object;
determine one or more deviations between the particular object in the particular image and the particular model in response to differences detected from comparing positioning of the particular object in the particular image to the positional commonality specified in the particular model, or comparing visual characteristics of the particular image to the visual characteristic commonality specified in the particular model; and
generate an edited image from the unedited image by automatically correcting, without user input, the one or more deviations, wherein correcting the one or more deviations comprises generating the edited image with the particular object having one or more of a different size, orientation, positioning, coloring, lighting, exposure, highlights, temperature, sharpness, contrast, brightness, tint, shadow, or reflectivity than the particular object of the unedited image.

15. The device of claim 14, wherein the one or more processors are further configured to:
determine a particular visual guide from a plurality of visual guides that is associated with the particular object in the particular image, wherein the particular visual guide comprises a wireframe of the particular object or the particular object type.

16. The device of claim 15, wherein the one or more processors are further configured to:
define the positional commonality for the particular model relative to one or more of a size, orientation, and positioning of the particular visual guide; and
wherein correcting the one or more deviations further comprises adjusting one or more of the size, orientation, and positioning of the particular object in the particular image to match the size, orientation, and positioning of the particular visual guide.

17. The device of claim 15, wherein the one or more processors are further configured to:
- define different visual characteristic commonality for the particular model at different regions of the particular visual guide, wherein said defining comprises defining one or more of a first coloring, lighting, exposure, highlight, temperature, sharpness, contrast, brightness, tint, shadow, or reflectivity for a first region of the particular visual guide, and a different second coloring, lighting, exposure, highlight, temperature, sharpness, contrast, brightness, tint, shadow, or reflectivity for a different second region of the particular visual guide; and
- wherein correcting the one or more deviations further comprises adjusting one or more of coloring, lighting, exposure, highlight, temperature, sharpness, contrast, brightness, tint, shadow, or reflectivity in a particular region of the particular object in the particular image to match coloring, lighting, exposure, highlight, temperature, sharpness, contrast, brightness, tint, shadow, or reflectivity at a corresponding region of the particular visual guide that overlaps with the particular region of the particular object.

18. A non-transitory computer-readable medium, storing a plurality of processor-executable instructions to:
- receive a particular image of a particular object, wherein the particular image is an unedited image of the particular object as captured by an imaging device;
- select a particular model that defines one or more of positional commonality or visual characteristic commonality between a set of images of the particular object or a particular object type that includes the particular object;
- determine one or more deviations between the particular object in the particular image and the particular model in response to differences detected from comparing positioning of the particular object in the particular image to the positional commonality specified in the particular model, or comparing visual characteristics of the particular image, the visual characteristic commonality specified in the particular model; and
- generate an edited image from the unedited image by automatically correcting, without user input, the one or more deviations, wherein correcting the one or more deviations comprises generating the edited image with the particular object having one or more of a different size, orientation, positioning, coloring, lighting, exposure, highlights, temperature, sharpness, contrast, brightness, tint, shadow, or reflectivity than the particular object of the unedited image.

\* \* \* \* \*